(12) United States Patent
Kiesewetter et al.

(10) Patent No.: US 6,824,227 B1
(45) Date of Patent: Nov. 30, 2004

(54) BRAKE SYSTEM FOR A MOTOR VEHICLE

(75) Inventors: Wolfgang Kiesewetter, Altdorf (DE); Bernd Knoff, Esslingen (DE); Manfred Steiner, Winnenden (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 10/019,486

(22) PCT Filed: May 16, 2000

(86) PCT No.: PCT/EP00/04363

§ 371 (c)(1),
(2), (4) Date: May 22, 2002

(87) PCT Pub. No.: WO01/02230

PCT Pub. Date: Jan. 11, 2001

(30) Foreign Application Priority Data

Jun. 29, 1999 (DE) .......................... 199 29 959

(51) Int. Cl.[7] .............................................. B60T 8/60
(52) U.S. Cl. .................................. 303/155; 303/113.4
(58) Field of Search ............................. 303/155, 3, 15, 303/20, 113.4

(56) References Cited

U.S. PATENT DOCUMENTS

| | | | | |
|---|---|---|---|---|
| 5,611,606 A | * | 3/1997 | Nell et al. .................. | 303/155 |
| 5,853,230 A | * | 12/1998 | Wagner et al. ........... | 303/113.4 |
| 5,967,624 A | * | 10/1999 | Graber et al. ............ | 303/113.4 |
| 5,978,725 A | * | 11/1999 | Kagawa ....................... | 701/70 |
| 6,120,110 A | * | 9/2000 | Shimizu .................. | 303/113.4 |
| 6,196,643 B1 | * | 3/2001 | Yokoyama et al. ......... | 303/155 |
| 6,217,133 B1 | * | 4/2001 | Yoshida .................... | 303/113.4 |
| 6,227,629 B1 | * | 5/2001 | Yoshida et al. ............. | 303/155 |
| 6,234,589 B1 | * | 5/2001 | Yoshida ...................... | 303/157 |
| 6,244,672 B1 | * | 6/2001 | Hachtel ...................... | 303/155 |

* cited by examiner

Primary Examiner—Robert A. Siconolfi
(74) Attorney, Agent, or Firm—Crowell & Moring LLP

(57) ABSTRACT

A brake system for a vehicle is equipped with a brake servo assistance unit for the automatic generation of brake force and with at least one sensor for the generation of a measuring signal. This signal represents an activity on the part of the driver and can be fed to a brake pressure control unit. An activation control signal for the actuation of the brake servo assistance unit can be generated should the measuring signal lie within an activation value range. In order to improve operating reliability, at least two sensors are provided for measurement of an activity on the part of the driver, and an activation control signal can be generated should the measuring signals from the sensors each exceed a reference value.

13 Claims, 1 Drawing Sheet

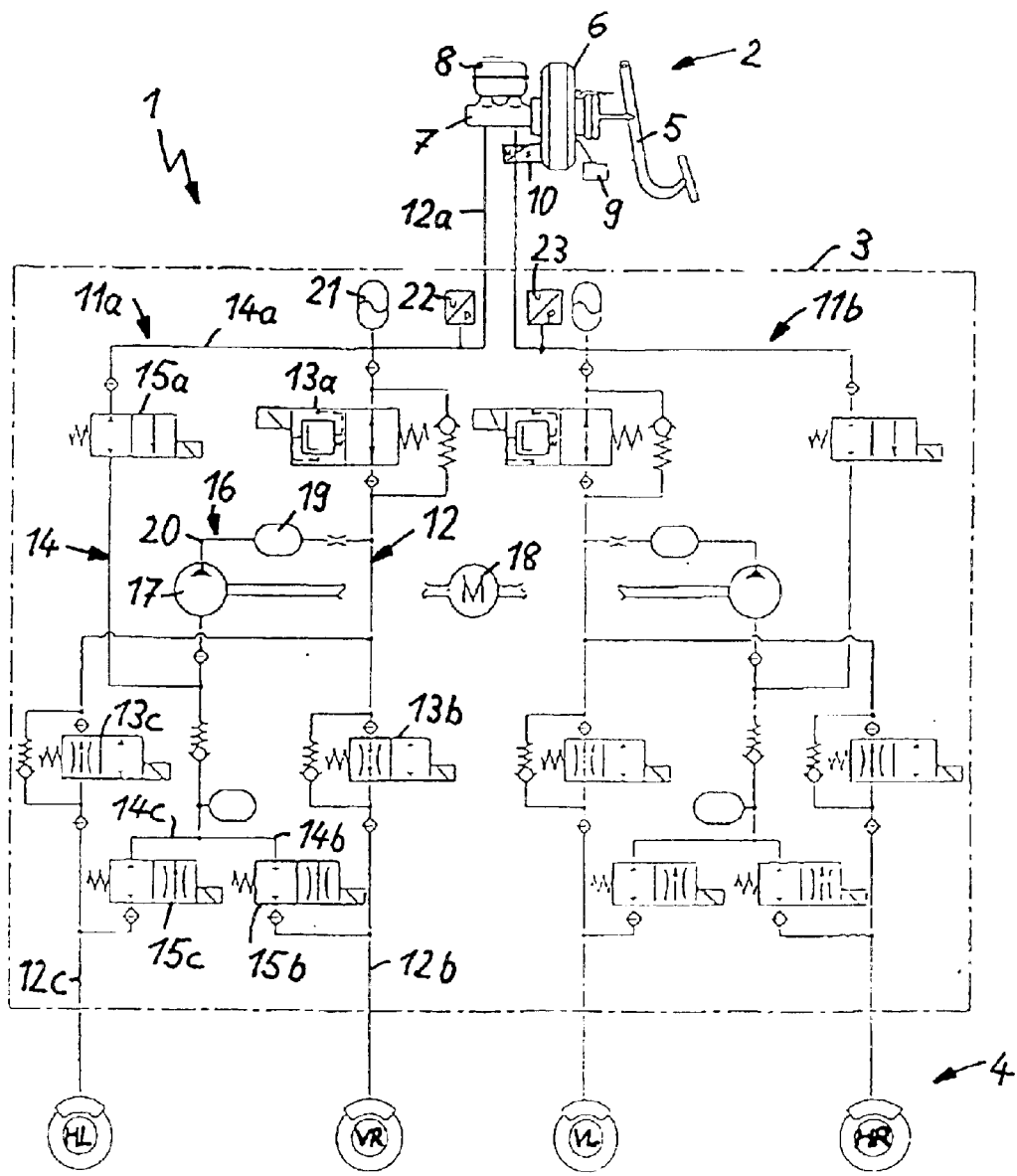

BRAKE SYSTEM FOR A MOTOR VEHICLE

BACKGROUND OF THE INVENTION

The present invention relates to a brake system for a vehicle.

DE 43 29 140 A1 discloses a brake system with two brake circuits in which a brake servo assistance unit performs an automatic braking action. The brake servo assistance unit is activated when the brake pedal is operated very rapidly. For this purpose the brake system has a pedal position sensor and a pressure sensor.

DE 195 20 609 A1 describes a pressure sensor for measuring the pressure arranged at the outlet of the brake master cylinder in both brake circuits of the brake system.

EP 08 19 591 A1 discloses a method for performing an automatic braking action. The brake servo assistance unit is first activated when the accelerator pedal return rate of travel exceeds a certain threshold value, and this temporary activation is maintained only if a brake pedal actuation occurs during a specific time window.

SUMMARY OF THE INVENTION

An object of the present invention is to avoid unnecessary activations of the brake servo assistance unit and at the same time to ensure a fail-safe operation of the brake system.

According to the invention this object has been achieved by providing that two pressure sensors are provided and have different reference values assigned thereto, each of the pressure sensors being operatively associated with one of the brake circuits, and the activation control signal is generated for temporary activation of the brake servo assistance unit for a limited time period, in the event that a higher of the reference values from the first pressure sensor is exceeded and a lower of the reference values for the second pressure sensor has not yet been attained.

According to the invention a temporary, preventative activation is performed for a limited period of time should the higher reference value of one sensor be exceeded, while the lower reference value of the second sensor has not yet been attained. In this situation the conditions for unrestricted activation are not yet met, but activation is nonetheless undertaken for the limited period of time and is advantageously maintained provided that the reduced reference value of the second sensor is exceeded during the period of activation. If the conditions for permanent activation are not fulfilled during the defined period, a deactivation control signal is automatically generated.

This improved procedure affords the advantage that additional brake force is made available within a shorter response time. Furthermore, the reactive effect on the driver is reduced, since owing to the limited period of time the braking action only takes partial effect. This avoids irritation being caused to the driver.

The activation control signal is suitably generated should a gradient be calculated from successive measuring signals of each of the two sensors and the gradients for each of the two sensors exceed a reference value. As an alternative activation criterion, however, it is also contemplated to take account of the gradient for one sensor and the absolute value for the second sensor. It is furthermore contemplated to utilize the absolute values from both sensors in order to assess whether activation is to be undertaken.

For deactivation of the brake servo assistance unit it is duly sufficient for the measuring signal from just one sensor to fall below a reference value. Adopting this approach ensures that even in the event of one sensor failing, the automatic generation of brake force is deactivated again provided that the measuring signal from at least one intact sensor delivers a measuring signal that lies within the deactivation value range. This makes it possible to avoid operating situations in which the brake system erroneously delivers brake force even though a situation that justifies the provision of additional brake force no longer exists; that is the brake system is of redundant design with regard to deactivation and operating safety is improved.

The values for the activation range and the deactivation range may differ, for example, activation occurring at higher values, or in the event of higher gradients derived from the absolute measuring signals, than deactivation. The differing activation and deactivation conditions increase the margin of safety against erroneous, accidental activation of the brake system.

It may be appropriate to configure at least one sensor as a travel sensor. Where one pressure sensor and one travel sensor are provided, a current speed value is preferably determined from successive measuring signals of the travel sensor, and together with the pressure gradient of the pressure sensor this is used as the basis for the query as to whether the brake system is to be activated. As an alternative condition, however, account may also be taken of the pressure/speed or pressure gradient/travel combination.

In an advantageous development, it is merely sufficient for the measuring signal of the travel sensor to fall below a reference value, in order to trigger the deactivation control signal.

It may be advisable to provide alternative conditions both for the activation and for the deactivation of the brake system. Activation or deactivation then occurs if just one of the formulated conditions is met.

BRIEF DESCRIPTION OF THE DRAWINGS

Other objects, advantages and novel features of the present invention will become apparent from the following detailed description of the invention when considered in conjunction with the accompanying drawings.

The sole FIGURE is a schematic circuit diagram of the hydraulic brake system according to the present invention.

DETAILED DESCRIPTION OF THE DRAWINGS

The brake system 1 of a motor vehicle comprises an actuating unit 2 for activation of the wheel brake by the driver, a hydraulic unit 3 for transmission and modulation of the required brake pressure and wheel brake units 4 on the front left (FL), front right (FR), rear left (RL) and rear right (RR) wheels of the vehicle. The actuating unit 2 comprises a brake pedal 5, a booster 6, a master cylinder 7 and a reservoir tank 8. In addition, a trip switch 9 and a travel sensor 10 are assigned to the actuating unit 2. The hydraulic unit 3 comprises two brake circuits 11a, 11b, which are of inverse design construction. The first brake circuit 11a supplies brake pressure to the RL and FR wheel brake units, the second brake circuit 11b is assigned to FL and RR wheel brake units.

A brake light switch may also be used in place of the trip switch 9.

When the brake pedal 5 is actuated, the pedal force applied by the driver is boosted by the booster 6, the force generated by the booster 6 being converted in the master cylinder 7, which is fed with hydraulic medium from the reservoir tank 8, into hydraulic brake pressure, which is delivered to the two brake circuits 11a, 11b of the hydraulic unit 3.

The following description of the hydraulic unit 3 relates only to the first brake circuit 11a, the second brake circuit 11b in the illustrated embodiment shown being of similar construction to the first brake circuit 11a. All components of the hydraulic unit 3 can be adjusted by signals from a control unit (not shown).

The brake pressure generated in the master cylinder 7 is delivered by way of a hydraulic line 12 to the RL and FR wheel brake units of the first brake circuit 11a. The hydraulic line 12 comprises three sections 12a, b, c, the first section 12a branching off from the master cylinder 7 dividing into the two further sections 12b, c, which are each assigned to a wheel brake unit, FR and RL respectively. A servo valve 13a, b, c is arranged in each section 12a, b, c of the hydraulic line 12 and a non-return valve is assigned to each servo valve 13a, b, c. The non-return valve assigned to the first servo valve 13a in the common line section 12a opens in the direction of the wheel brake units, whereas the non-return valves assigned to the other servo valves 13b, c open in the direction of the actuating unit 2. The common line section 12a is connected to a compensating accumulator 21 upstream of the servo valve 13a.

When the driver operates the brake pedal 2, thereby generating a brake pressure, control signals from the control unit move the servo valves 13a, b, c into the opening position, so that the brake pressure from the actuating unit 2 can be delivered to the wheel brake units 4 in order to generate a wheel brake force.

The return flow of hydraulic medium is by way of a return line 14, which comprises two line sections 14b, c, which branch off from the feed line sections 12b, c, and a common line section 14a, into which the sections 14b, c open and which in turn opens into the upper section 12a of the hydraulic line 12. Each servo valve 15a, b, c is arranged in each respective section 14a, b, c of the return line 14. An intermediate accumulator and a non-return valve opening in the direction of the return flow are situated in the upper line section 14a between the union of the lower line sections 14b, c and the upper servo valve 15a. The servo valves 15a, b, c may be opened by the control unit for the return flow of hydraulic medium.

In the brake circuit 11a of the hydraulic unit 3 an automatic brake servo assistance unit 16 is furthermore provided. The unit 16 comprises a hydraulic pump 17, a hydraulic motor 18 and an intermediate accumulator 19 in a line 20 which branches off from the section 14a of the return line 14 and which opens into the common line section 12a of the hydraulic line 12 downstream of the servo valve 13a. On actuation of the hydraulic motor 18 and the hydraulic pump 17 respectively, additional brake pressure is generated, which additional pressure is fed into the common line section 12a and delivered to the wheel brake units 4, thereby generating a boosted brake force. The actuation of hydraulic motor 18 and hydraulic pump 17, both the activation and the deactivation, is triggered by control signals from the control unit as a function of input signals which are generated as measuring signals by the sensors 9, 10 in the actuating unit 2 and, where applicable, by other sensors 22, 23 in the hydraulic unit 3.

The sensor 9 in the actuating unit 2 is configured as a trip switch which is installed in the booster 6 and has the function of deactivating the automatic brake servo assistance unit 16 as soon as the brake pedal 5, starting from an actuation position, covers a release travel towards the initial home position. In this event, the driver withdraws the pedal force, from which it can be inferred that no additional brake servo assistance is required, whereupon the servo assistance unit is deactivated.

The further sensor 10 in the actuating unit 2 is configured as a travel sensor, which senses either the control movement of the brake pedal or the control movement of the cylinder in the master cylinder 7 corresponding to the control movement of the brake pedal. The sensor 22 in the hydraulic unit 3 is a pressure sensor which is arranged in the common line section 12a and measures the pressure in the hydraulic line 12.

The brake servo assistance unit 16 is activated in the event of at least one of the following criteria being fulfilled:

The pressure gradient in the hydraulic line 12 is calculated from successive measuring signals of the pressure sensor 22 in the control unit. The speed with which the brake pedal 5 or the cylinder of the master cylinder 7 is moved is correspondingly calculated from successive measuring signals of the travel sensor 10. Should both the pressure gradient and the speed exceed a reference value assigned to each of them respectively, an activation control signal is generated for activation of the brake servo assistance unit 16.

The pressure value determined in the pressure sensor 22 and the speed value derived from the measuring signals of the travel sensor 10 exceed a reference value assigned to each of them respectively.

The pressure gradient derived from the measuring signals of the pressure sensor 22 and the travel determined in the travel sensor exceed, a reference value assigned to each of them respectively.

The measuring signals from the pressure sensor 22 and the measuring signals from the pressure sensor 23 exceed a reference value in each case. Pressure values and/or pressure gradients may be used as measuring signals. Instead of an arrangement of the pressure sensors spread over two brake circuits, it may also be appropriate to arrange both pressure sensors in one brake circuit.

The measuring signals from the sensors must in each case exceed an assigned reference value for an activation control signal to be generated. The reference values may assume different values, especially where two sensors of the same type are provided, with the lower value being obtained through multiplying the higher value by a reduction factor, which suitably lies between 0.5 and 1.

In this case, a two-stage activation is performed. Once the higher reference value of a sensor is exceeded, but the lower reference value of the second sensor has not yet been attained, a temporary activation can occur for a limited period, which is cancelled again, provided that the lower reference value of the second sensor is not exceeded during the set period of time. The period of time according to which the temporary activation is proportionately calculated is advantageously between one and ten working cycles of the brake system.

Should a higher reference value and at least one lower reference value be exceeded simultaneously in both sensors, activation occurs with no time limit. In this case, deactivation occurs only when the deactivation conditions are fulfilled.

The brake servo assistance unit 16 is deactivated by way of the trip switch 9 if the forces fall below a force reference value. The trip switch switches as a function of the pedal force acting on the brake pedal.

Deactivation may also occur if the measuring signal from the travel sensor 10 falls below a reference value, which may differ from the corresponding reference value for activation and may in particular assume a higher absolute value, in order to achieve a relatively rapid deactivation of the servo assistance unit. In addition, further deactivation criteria may be formulated, which are dependent on the pressure value, the pressure gradient or on the speed of the brake pedal control movement. If the deactivation criteria are formulated as a function of the sensor values of the travel sensor 10 or the pressure sensor 22, the trip switch 9 may also be dispensed with.

Taking account of two different measuring principles by using a pressure sensor and a travel sensor has the advantage that the failure probability of the brake servo assistance unit 16 is reduced, because the different types of sensors react to a fault in different ways.

In the second brake circuit 11b, a further pressure sensor 23 measures the pressure in the second hydraulic line supplying the brake circuit 11b. Doubling the number of pressure sensors in different brake circuits allows the brake system to be designed with redundancy and also formulated with limiting conditions.

The brake servo assistance unit is activated, for example, when the pressure gradients of both pressure sensors 22, 23 exceed a reference value, the reference values being different. In an alternative embodiment, activation occurs if the gradient of one pressure sensor and the pressure value of the second pressure sensor each exceed a reference value. In both cases it is possible to set a time window, during which the measuring signals must meet the specified conditions.

Deactivation advantageously occurs should one of the two pressure signals fall below a further reference value, mainly the deactivation threshold.

The two pressure sensors are appropriately arranged in different brake circuits.

In preferred embodiments, just two pressure sensors are used throughout the entire brake system. A force sensor or force sensors may also be used instead of the pressure sensor or pressure sensors.

Use of the present invention is feasible both in open hydraulic circuits and in closed hydraulic circuits of the brake system. The brake system according to the invention may be designed both with diagonally split brake circuits and with front axle/rear axle split brake circuits.

What is claimed is:

1. Brake system with two brake circuits for a vehicle, comprising a brake servo assistance unit for automatic generation of brake force, and at least one pressure sensor for generation of a measuring signal representative of an activity on a driver's part and fed to a brake pressure control unit, with an activation control signal for actuation of the brake servo assistance unit being generated in the event measuring signals from the sensors exceed a reference value, wherein
two pressure sensors are provided and have different reference values assigned thereto, each of the pressure sensors being operatively associated with one of the brake circuits, and the activation control signal is generated for temporary activation of the brake servo assistance unit for a limited time period in the event that a higher of the reference value from the first pressure sensor is exceeded and a lower of the reference values for the second pressure sensor has not yet been exceeded, and if conditions for permanent activation are unfulfilled for the limited time period a deactivation control signal is automatically generated.

2. Brake system according to claim 1, wherein at least one of absolute values and gradients are generated as the measuring signals.

3. Brake system according to claim 1, wherein one of the reference values is generated by multiplying the first reference value by a reduction factor of less than one.

4. Brake system according to claim 1, wherein the temporary activation is maintained for a limited, defined number of working cycles of the control unit and thereafter the deactivation control signal is generated for deactivation of the brake servo assistance unit.

5. Brake system according to claim 1, wherein the temporary activation is maintained in the event that the measuring signal from a second of the pressure sensors exceeds a reduced reference value during a defined number of working cycles.

6. Brake system according to claim 1, wherein the deactivation control signal deactivating the brake servo assistance unit is generated in the event that the measuring signal from one of the sensors falls below a reference value.

7. Brake system according to claim 1, wherein at least one travel sensor is provided for measuring the activity on the driver's part.

8. Brake system according to claim 7, wherein an activation control signal is generated in the event that a pressure gradient of one pressure sensor and a speed value calculated from successive measuring signals of the travel sensor each exceed a reference value.

9. Brake system according to claim 7, wherein an activation control signal is generated in the event that a pressure value of the pressure sensor and a speed value of the travel sensor each exceed a reference value.

10. Brake system according to claim 7, wherein an activation control signal is generated in the event that a pressure gradient of the pressure sensor and a travel of the travel sensor each exceed a reference value.

11. Brake system according to claims 7, wherein the deactivation control signal is generated in the event that the measuring signal from the travel sensor falls below a reference value.

12. Brake system according to claim 1, wherein a trip switch is provided for deactivation of the brake servo assistance unit operatively installed in the brake booster of the brake system, whereby the deactivation control signal is generated in the event that a measuring signal of the trip switch falls below a reference value.

13. Brake system according to claim 1, wherein the measuring signals from the sensors for generating the activation control signal are such as to occur within a defined time window.

* * * * *